2 Sheets—Sheet 1.
J. B. MORRISON.
DENTAL CHAIR.
No. 7,687. Reissued May 15, 1877.
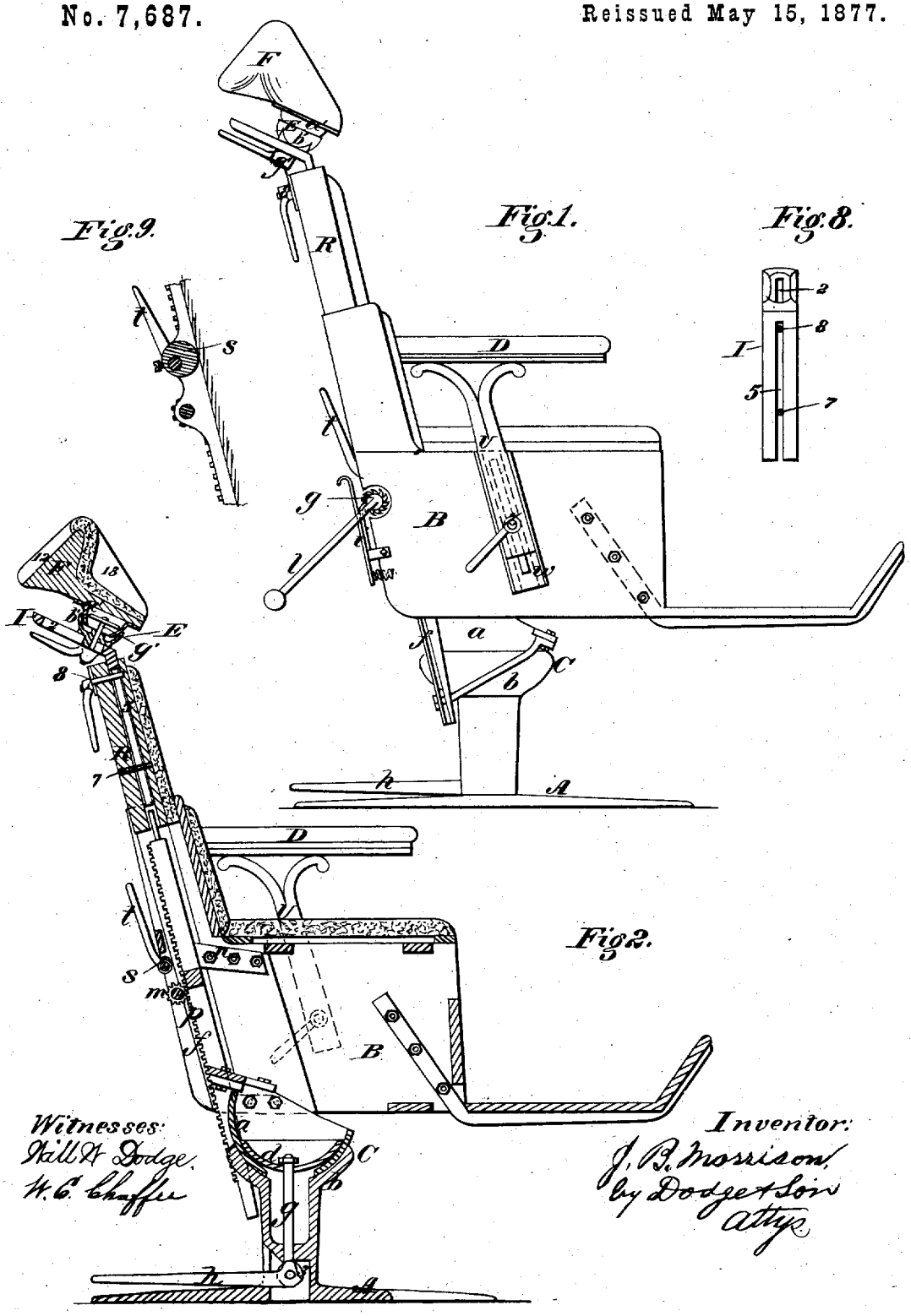
N. PETERS, PHOTO-LITHOGRAPHER, WASHINGTON, D. C.

2 Sheets—Sheet 2.

J. B. MORRISON.

DENTAL CHAIR.

No. 7,687.

Reissued May 15, 1877.

Witnesses:
Will H. Dodge.
W. E. Chaffee

Inventor:
J. B. Morrison
by Dodger & Son
Attys.

N. PETERS, PHOTO-LITHOGRAPHER, WASHINGTON, D.C.

UNITED STATES PATENT OFFICE.

JAMES B. MORRISON, OF BROOKLYN, NEW YORK.

IMPROVEMENT IN DENTAL CHAIRS.

Specification forming part of Letters Patent No. 82,542, dated September 29, 1868; patented in England December 7, 1867; reissue No. 7,687, dated May 15, 1877; application filed November 23, 1876.

*To all whom it may concern:*

Be it known that I, JAMES BEALL MORRISON, of Brooklyn, in the county of Kings and State of New York, have invented certain new and useful Improvements in Dental Chairs; and I do hereby declare that the following is a full, clear, and exact description thereof, reference being had to the accompanying drawings, making part of this specification, and to the letters of reference marked thereon—like letters indicating like parts wherever they occur.

To enable others skilled in the art to construct and use my invention, I will proceed to describe it.

The nature of my invention consists in a novel mode of raising and lowering the body of a chair, and in the novel means employed for adjusting and securing the same at any required angle. Further, in constructing an operating-chair with arms adjustable in reference to the seat of the same, and in the arrangement for adjusting and securing the back; and, further, in the manner of adjusting the head-rest of an operating-chair, and in so constructing and combining the various parts in an operating-chair as to enable it to be adjusted to adapt it to adults or children.

Figure 3:
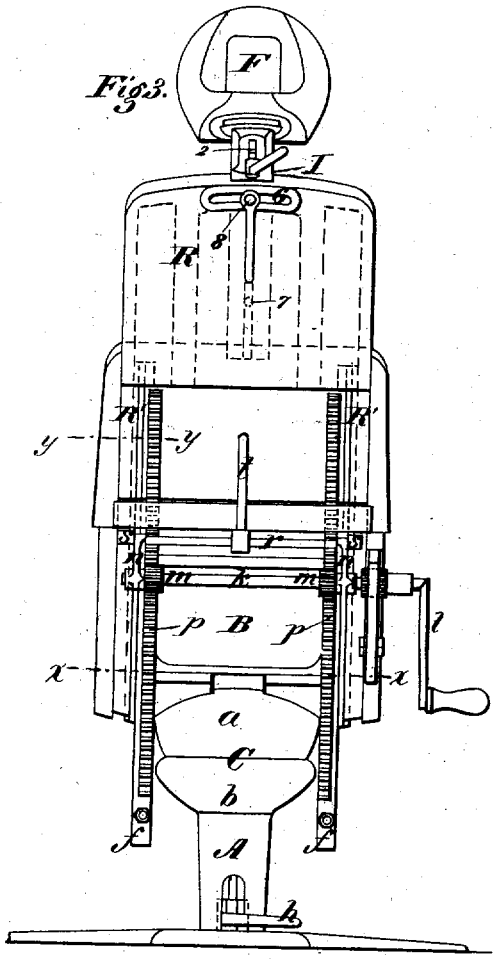
Figure 4:
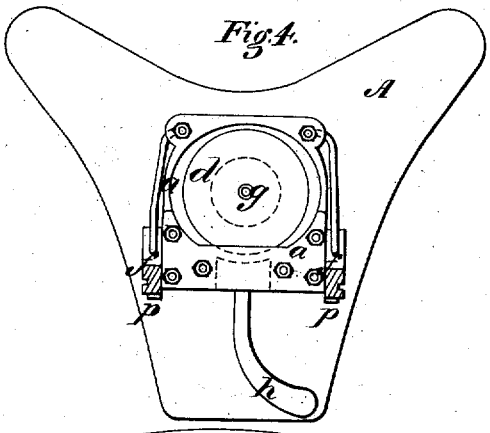
Figure 5:
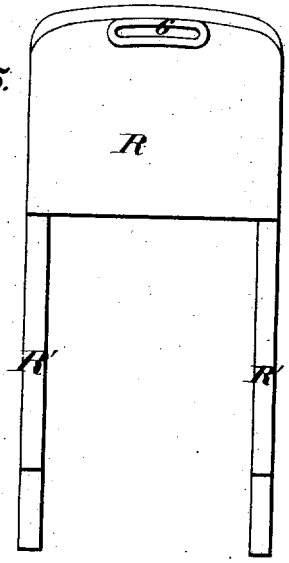
Figure 6:
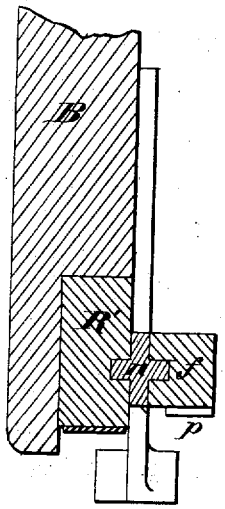
Figure 7:
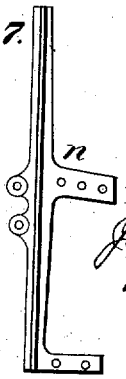

In the accompanying drawings, Figure 1 represents a side elevation of a dentist's operating-chair constructed according to my invention; Fig. 2, a vertical section of the same; Fig. 3, a back view of said chair; Fig. 4, a horizontal section on the line *x x* of Fig. 3. Fig. 5 shows the movable back of the chair-body detached. Fig. 6 is a section at line *y y* of Fig. 3. Figs. 7 and 9 show other portions of the chair detached; and Fig. 8, the head-rest supporting-bar.

It has heretofore been customary to construct dental chairs with the elevating mechanism underneath the body of the chair, the result of which is that the seat or body of the chair could not be brought as near the floor as is sometimes desirable. In addition to this objection, the vertical adjustment of a chair, having the mechanism and guiding devices arranged underneath it, is necessarily limited; and, moreover, where the elevating mechanism is arranged below the joint which governs the inclination of the chair, it is impossible to render the chair rigid, so as to hold the head of the patient in a fixed and firm position, for the reason that there is more or less play in the joints or parts of the elevating mechanism, and as this play is near the floor, it will be seen that it is greatly increased at the head-rest, the movements or oscillations being increased in proportion to the distance from the point where the movement or play of the parts occurs. It is to obviate these objections, among others, that my invention is designed, and to this end I construct my chair with the joint for inclining and fastening it rigid to the stand or support below the elevating mechanism, and arrange the guides on which the body of the chair moves, together with the elevating mechanism, at the back or sides instead of underneath.

The stand or foot A is formed of cast-iron, or other suitable material, and is made of the proper size and weight to give a firm and solid support to the body B of the chair while being used in whatever position the same may be adjusted. This body of the chair B is connected with the foot or stand A by means of a universal joint, C, which consists of a hollow hemispherical piece, *a*, a cup or socket, *b*, and a convex piece, *d*. The part *b* of the said universal joint is attached to the stand or foot A, while the hollow hemispherical piece *a* of the said joint is attached to slides *f*, which extend upward and downward from the said joint at the back of the chair. To the convex piece *d* a bolt, *g*, is attached, which, when tightened, connects the socket *b* with the hemispherical piece *a*, and thus locks the two parts of the joint securely together. The bolt *g* is jointed to the foot-lever *h*, which is formed with the cam or projection 3. When this lever *h* is depressed, as shown in Fig. 2, this cam 3 presses against the stand A, and thereby tightens the bolt *g*. By slackening the said bolt, the hemispherical piece *a* will be allowed to turn freely in the socket *b*, and will thus allow the body B of the chair to be adjusted in any desired position. The bolt *g* can then be tightened, the cup *b* and convex piece *d* being thereby made to bind closely upon the hemispherical piece *a*, and thus hold the parts of the joint securely and immovably together. The aperture in the stand or foot A, through which the bolt *g* passes, is much larger than the said bolt, to allow the required adjustment of the hemispherical piece *a* within its cup.

To the body B of the chair pieces *n* are securely fastened, (shown separate in Fig. 7,) capable of moving in suitable grooves or guides in the uprights *f*, which are rigidly secured to the hemispherical piece *a*, as shown in Fig. 2, and which serve as guides and supports for the body B of the chair in its vertical adjustments, and allow the body of the chair B to be moved upward or downward. An elevating screw or screws may be arranged between these uprights *f*, but I prefer that the chair should be provided with pinions *m*, geared into toothed racks *p* attached to the uprights *f*.

The pinions *m* are fixed on an axle, *k*, arranged in suitable bearings in the frames *n*, and are provided with a handle, *l*, arranged by the side of the chair. By turning the handle, the entire body B can be conveniently raised or lowered, as desired.

The shaft or axle K also carries a ratchet-wheel, *q*, which is arranged, in connection with a pawl, *i*, in such a manner as to prevent the lowering of the chair by its own weight when the handle *l* is released.

The pawl *i* is attached to a lever pivoted to the side of the chair, and arranged with a suitable spring to keep the pawl in gear with the ratchet-wheel until it is desired to raise or lower the chair, when the ratchet-wheel is released by pulling back the lever, which extends upward for convenience of manipulation.

By this arrangement of parts it will be seen that the seat can be brought low down, the chair made to have a great range of vertical adjustment, as the guides can be made of any desired length, and, having a long bearing, admits of very little play, which play, being nearer the top, reduces the oscillation of the head-rest to the least possible amount. The operating part of the elevating mechanism is also brought into a position where the attendant can operate it while standing in a natural position, without stooping, as is necessary when placed underneath the chair, thus rendering it more convenient, and better in all respects.

The back R of the chair is constructed to slide independently up and down at the rear of the seat, and may be jointed to the arms D; but I prefer to connect the arms to the sides of the body B of the chair.

Fig. 6, which is an enlarged section on the line *y y*, Fig. 3, illustrates the arrangement of the uprights *f* and sliding back R. Cruciform pieces or frames *n* (a side elevation of which is shown in Fig. 7) are attached to the body B of the chair by suitable lugs, and are fitted to move up and down in the uprights *f*, and also form guides for the legs R′ of the adjustable back R. These pieces *n* also carry the bearings for the shafts *k* and *r*. The latter is provided with a cam, *s*, at each end, to secure the back R in any desired position, as shown more clearly in Fig. 9. The shaft *r* is operated by a handle, *t*, and the cam *s* acts against the back of the legs R′ of the movable back R. It is obvious that any known form of slides may be used.

I prefer to adopt the method of construction illustrated in Figs. 1, 2, and 3, in which the arms D are arranged to move up and down independently of the back R in the following manner: Each arm is formed with a flat piece, *v*, extending downward, which piece fits between guide-pieces *w* on the side of the seat or body B of the chair. A pinching-screw, *z*, passes through the piece *v*, and through a suitable slot, which screw serves to lock the arms in any position into which they may be adjusted. Instead of a screw, an eccentric or other pinching device may be fitted in any convenient position of the guides *w*, which are made of sufficient length, and are so arranged that the arms are supported firmly therein, but will slide freely up and down when released from the pinching-screw or other device.

The head-rest F is provided with a universal joint, E, similar in construction to that employed below the body of the chair. The cup or socket *b′* of said joint is supported upon a bar, I, secured to the back of the chair, as shown in Figs. 1 and 2, the bar itself being shown detached in Fig. 8. As shown in Figs. 1 and 2, this bar I has its upper end inclined or bent backward, and in this bent portion I make a slot, 2, through which passes the rod that clamps the joint E, said rod being provided with a clamp-nut, *g′*, as shown in Fig. 2.

By this construction and arrangement of parts it will be seen that the head-rest can be turned around horizontally at any angle desired, also inclined in any direction laterally, and also be adjusted farther back or forward, as may be desired.

In order to adjust it vertically, and also laterally, the bar I is provided with a long slot, 5, in its lower portion, so that when the bar is inserted in its place in the back of the chair it will straddle a stationary pin or bolt, 7, as shown in Figs. 2 and 3, while above that in the same slot is placed a bolt, 8, on which is a clamping-nut, with a handle for tightening it. In the back of the chair is made a transverse slot, 6, as shown in Fig. 3, through which the bolt 8 passes, and in which it can be moved loosely when unclamped.

It will thus be seen that the bar I has two separate and independent adjustments—the one vertical, and the other lateral—the pin 7 serving as a guide to hold the bar centrally at that point, and permitting it to be moved up ar down, and also to have its upper end, with the head-rest, swung to one or the other side, as may be desired, thus giving great facility and range of adjustment for the head-rest.

In order to still further increase the adjustments for the patient's head, the head-rest may be made with two cushions, 12 and 13, as shown in Fig. 2, one being directly over the joint, and the other projecting at one side, as shown, it being capable of being turned around by merely loosening the clamp, so as to bring either of the cushions into position for the head, one being best adapted for certain operations, and the other for other operations.

Having thus described my invention, what I claim is—

1. In combination with the stand or support for a dental chair, uprights or guides, secured directly to said stand in such manner that they can be inclined or adjusted substantially as and for the purpose set forth.

2. The combination, in a dental chair, of a stand or support, the uprights or guides, and a locking or clamping device for securing said uprights or guides at any desired angle, substantially as described.

3. The combination, in a dental chair, of a stand or support, the uprights or guides, a locking or clamping device for securing said uprights or guides at any desired angle or inclination, and an elevating mechanism for raising and lowering the body of the chair, substantially as described.

4. A chair having its body arranged to be adjusted vertically, and having the operating mechanism, by which it is thus adjusted, arranged at the back or outside of the periphery of the seat instead of under the seat, substantially as described.

5. The combination, in a dental chair, of a back, vertically adjustable in reference to the seat, with a vertically-adjustable head-rest, substantially as set forth.

6. The combination, in a dental chair, of a back, vertically adjustable in reference to the seat, with a laterally-adjustable head-rest, substantially as described.

7. The combination, in a dental chair, of a back, vertically adjustable in reference to the seat, with a vertically and laterally adjustable head-rest, substantially as set forth.

8. A chair, having its arms attached to the body, substantially as described, whereby they can be adjusted vertically independent of the adjustment of the body, substantially as set forth.

9. The vertically-adjustable arms, provided with a clamping device, whereby they may be secured at any desired height.

10. A head-rest support, capable of a vertical and a lateral adjustment within the back of the chair, substantially as described.

11. The slotted bar I, arranged to slide vertically and swing laterally on the pin 7, substantially as shown and described.

12. In combination with the adjustable back R, the cams *s*, or their equivalent, for securing said back in the desired positions, substantially as described.

13. The slotted bar I, arranged within the back of the chair, so that it can be moved vertically and swung laterally, in combination with the head-rest, provided with a universal joint, whereby the head-rest can be adjusted, substantially as described.

14. A head-rest, provided with two cushions or head-supports, 12 and 13, substantially as described.

JAMES BEALL MORRISON.

Witnesses:

THEO. C. DISBROW,
JOS. HASLACH.